(12) United States Patent
Hoerle et al.

(10) Patent No.: US 10,762,570 B2
(45) Date of Patent: Sep. 1, 2020

(54) SYSTEM AND METHOD FOR USING A FIRST ELECTRONIC REPRESENTATION OF CONTRACT TERMS FOR GENERATING A SECOND ELECTRONIC REPRESENTATION OF THE CONTRACT TERMS

(71) Applicant: Cognizant TriZetto Software Group, Inc., Englewood, CO (US)

(72) Inventors: Dale E. Hoerle, Naperville, IL (US); Jeffery K. Hensley, Genoa, IL (US)

(73) Assignee: Cognizant TriZetto Software Group, Inc., Englewood, CO (US)

( * ) Notice: Subject to any disclaimer, the term of this patent is extended or adjusted under 35 U.S.C. 154(b) by 1240 days.

(21) Appl. No.: 14/304,527

(22) Filed: Jun. 13, 2014

(65) Prior Publication Data

US 2014/0297336 A1 Oct. 2, 2014

Related U.S. Application Data

(62) Division of application No. 10/965,673, filed on Oct. 14, 2004, now Pat. No. 8,768,729.

(51) Int. Cl.
*G06Q 40/08* (2012.01)
*G06Q 40/00* (2012.01)
*G06Q 10/10* (2012.01)

(52) U.S. Cl.
CPC ............. *G06Q 40/08* (2013.01); *G06Q 10/10* (2013.01); *G06Q 40/00* (2013.01)

(58) Field of Classification Search
None
See application file for complete search history.

(56) References Cited

U.S. PATENT DOCUMENTS

| 4,491,725 A | 1/1985 | Pritchard | 705/2 |
| 4,858,121 A | 8/1989 | Barber et al. | 705/2 |

(Continued)

FOREIGN PATENT DOCUMENTS

| DE | 19641357 | 9/1998 | G06F 17/60 |
| JP | 11242270 | 9/1999 | G03B 15/05 |

(Continued)

OTHER PUBLICATIONS

Miller, Lawrence G., "Reducing Health Care Costs Using Claims Adjudication Software" [online], Physician Executive, May 1, 1993 [retrieved on Dec. 14, 2010], 4 pp., Retrieved from the Internet: http://www.thefreelibrary.com/Reducing+health+ca . . . .*

(Continued)

*Primary Examiner* — Olabode Akintola
(74) *Attorney, Agent, or Firm* — Dawn-Marie Bey; Bey & Cotropia PLLC

(57) ABSTRACT

Systems and methods are provided in which contract terms from a first electronic representation of a contract are used to form at least a part of a second electronic representation of the contract. For instance, the first electronic representation of a contract may be formed for use with a first software application, such as an adjudication application, and such first electronic representation of the contract is used by a system to form at least part of a second electronic representation of the contract, wherein such second electronic representation is used by a second software application, such as a contract management application. Disparate applications often utilize different representations of contract terms, and certain embodiments enable a second electronic representation to be formed by the system at least in part from a first electronic representation so that the different electronic representations are consistent as to the overlapping contract terms included therein.

12 Claims, 3 Drawing Sheets

(56) References Cited

U.S. PATENT DOCUMENTS

| | | | |
|---|---|---|---|
| 4,916,611 A | 4/1990 | Doyle, Jr. et al. | 705/2 |
| 5,134,564 A | 7/1992 | Dunn et al. | 705/33 |
| 5,191,522 A | 3/1993 | Bosco et al. | 705/4 |
| 5,235,507 A | 8/1993 | Sackler et al. | 705/2 |
| 5,253,164 A | 10/1993 | Holloway et al. | 705/2 |
| 5,301,105 A | 4/1994 | Cummings, Jr. | 705/2 |
| 5,324,077 A | 6/1994 | Kessler et al. | 283/54 |
| 5,333,317 A | 7/1994 | Dann | |
| 5,339,434 A | 8/1994 | Rusis | 709/246 |
| 5,359,509 A | 10/1994 | Little et al. | 705/2 |
| 5,410,675 A | 4/1995 | Shreve et al. | 710/65 |
| 5,471,382 A | 11/1995 | Tallman et al. | 600/300 |
| 5,493,671 A | 2/1996 | Pitt et al. | |
| 5,517,405 A | 5/1996 | McAndrew et al. | 706/45 |
| 5,539,787 A | 7/1996 | Nakano et al. | 375/377 |
| 5,544,044 A | 8/1996 | Leatherman | 705/3 |
| 5,581,558 A | 12/1996 | Horney, II et al. | 370/401 |
| 5,583,760 A | 12/1996 | Klesse | 705/38 |
| 5,644,778 A | 7/1997 | Burks et al. | 705/2 |
| 5,692,501 A | 12/1997 | Minturn | 600/301 |
| 5,704,044 A | 12/1997 | Tarter et al. | 705/4 |
| 5,708,828 A | 1/1998 | Coleman | 715/205 |
| 5,724,379 A | 3/1998 | Perkins et al. | 705/2 |
| 5,793,771 A | 8/1998 | Darland et al. | 370/467 |
| 5,815,689 A | 9/1998 | Shaw et al. | 713/400 |
| 5,832,447 A | 11/1998 | Rieker et al. | 705/2 |
| 5,845,254 A | 12/1998 | Lockwood et al. | 705/2 |
| 5,879,163 A | 3/1999 | Brown et al. | 434/236 |
| 5,890,129 A * | 3/1999 | Spurgeon | B42D 15/00 705/4 |
| 5,907,490 A | 5/1999 | Oliver | 700/90 |
| 5,915,241 A | 6/1999 | Giannini | 705/2 |
| 5,930,759 A | 7/1999 | Moore et al. | 705/2 |
| 5,950,168 A | 9/1999 | Simborg et al. | 705/3 |
| 5,950,169 A | 9/1999 | Borghesi et al. | 705/4 |
| 5,970,463 A | 10/1999 | Cave et al. | 705/3 |
| 5,991,733 A | 11/1999 | Aleia et al. | 705/8 |
| 5,991,876 A | 11/1999 | Johnson et al. | 726/28 |
| 6,012,035 A | 1/2000 | Freeman, Jr. et al. | 705/2 |
| 6,052,524 A | 4/2000 | Pauna | 703/22 |
| 6,088,677 A | 7/2000 | Spurgeon | 705/4 |
| 6,094,684 A | 7/2000 | Pallmann | 709/227 |
| 6,111,893 A | 8/2000 | Volftsun et al. | 370/466 |
| 6,112,183 A | 8/2000 | Swanson et al. | 705/2 |
| 6,208,973 B1 | 3/2001 | Boyer et al. | 705/2 |
| 6,226,658 B1 | 5/2001 | Smith | 715/207 |
| 6,253,186 B1 | 6/2001 | Pendleton, Jr. | 705/2 |
| 6,283,761 B1 | 9/2001 | Joao | 434/236 |
| 6,324,516 B1 | 11/2001 | Shults et al. | 705/2 |
| 6,341,265 B1 | 1/2002 | Provost et al. | 705/2 |
| 6,343,271 B1 * | 1/2002 | Peterson | G06Q 40/02 705/4 |
| 6,453,297 B1 | 9/2002 | Burks et al. | 705/3 |
| 6,529,876 B1 | 3/2003 | Dart et al. | 705/4 |
| 6,542,905 B1 | 4/2003 | Fogel et al. | |
| 6,587,829 B1 | 7/2003 | Camarda et al. | 705/3 |
| 6,618,808 B1 | 9/2003 | Johnson et al. | 726/4 |
| 6,658,630 B1 | 12/2003 | Threatt et al. | 716/103 |
| 6,665,685 B1 | 12/2003 | Bialic | |
| 6,735,569 B1 | 5/2004 | Wizig | 705/4 |
| 6,763,346 B1 * | 7/2004 | Nishida | G06F 16/93 707/802 |
| 6,915,265 B1 | 7/2005 | Johnson | 705/2 |
| 7,016,856 B1 | 3/2006 | Wiggins | 705/2 |
| 7,194,416 B1 | 3/2007 | Provost et al. | 705/2 |
| 7,344,496 B2 | 3/2008 | Iliff | 600/300 |
| 7,346,522 B1 * | 3/2008 | Baylor | G06F 19/328 705/3 |
| 7,389,245 B1 | 6/2008 | Ashford et al. | 705/2 |
| 7,464,040 B2 | 12/2008 | Joao | 705/2 |
| 7,774,252 B2 | 8/2010 | Seare et al. | 705/35 |
| 7,904,317 B1 | 3/2011 | Lesswing et al. | 705/4 |
| 2002/0019754 A1 | 2/2002 | Peterson et al. | 705/4 |
| 2002/0077869 A1 | 6/2002 | Doyle et al. | 705/4 |
| 2002/0138304 A1 | 9/2002 | Fontanesi | 705/2 |
| 2002/0178120 A1 | 11/2002 | Reid et al. | 705/59 |
| 2002/0194008 A1 | 12/2002 | Yang et al. | 705/310 |
| 2003/0023466 A1 | 1/2003 | Harper | 705/37 |
| 2003/0033162 A1 | 2/2003 | Houssiaux et al. | 705/7.11 |
| 2003/0033240 A1 | 2/2003 | Balson et al. | 705/37 |
| 2003/0046093 A1 | 3/2003 | Erickson et al. | 705/51 |
| 2003/0046116 A1 | 3/2003 | Horowitz et al. | 705/4 |
| 2003/0061174 A1 | 3/2003 | Menninger | 705/400 |
| 2003/0084004 A1 | 5/2003 | Morciniec et al. | 705/80 |
| 2003/0097329 A1 | 5/2003 | Nabe et al. | 705/38 |
| 2003/0115156 A1 | 6/2003 | Baker | 705/400 |
| 2003/0212582 A1 | 11/2003 | Taschner | 705/4 |
| 2004/0024683 A1 | 2/2004 | Morciniec et al. | 705/37 |
| 2004/0034607 A1 | 2/2004 | Piccinelli | 705/80 |
| 2004/0083119 A1 * | 4/2004 | Schunder | G06Q 10/10 705/1.1 |
| 2004/0085355 A1 | 5/2004 | Harmes et al. | 715/751 |
| 2005/0033609 A1 | 2/2005 | Yang | 705/2 |
| 2005/0091143 A1 | 4/2005 | Schmidt et al. | 705/37 |
| 2005/0108067 A1 | 5/2005 | Chapman et al. | 705/4 |
| 2005/0187797 A1 | 8/2005 | Johnson | 705/3 |
| 2005/0247777 A1 | 11/2005 | Pitroda | 235/380 |
| 2006/0085311 A1 | 4/2006 | Hoerle et al. | 705/35 |
| 2007/0203834 A1 | 8/2007 | Field | 705/40 |
| 2010/0235197 A1 | 9/2010 | Dang | 705/3 |
| 2012/0173273 A1 | 7/2012 | Ashford | 705/2 |

FOREIGN PATENT DOCUMENTS

| | | | |
|---|---|---|---|
| WO | WO 84/01448 | 4/1984 | G06F 3/00 |
| WO | WO 91/15817 | 10/1991 | G06F 19/00 |
| WO | WO 95/03569 | 2/1995 | G06Q 40/00 |
| WO | WO 95/12857 | 5/1995 | G06Q 17/60 |
| WO | WO 99/22330 | 5/1999 | G06F 19/00 |
| WO | WO 99/44111 | 9/1999 | G06Q 20/00 |
| WO | WO 00/03343 | 1/2000 | G06F 1/00 |
| WO | WO 00/66367 | 11/2000 | B42D 1/10 |

OTHER PUBLICATIONS

U.S. Appl. No. 10/923,539, filed Aug. 20, 2004, Hensley, et al.

U.S. Appl. No. 09/577,386, filed May 23, 2000, Hensley, et al.

"National Health Plan Identifier, The Establishment of a Standard for a National Health Plan Identifier Issue Paper" [online], Mar. 11, 1998 [retrieved on Dec. 14, 2010], 13 pp., Retrieved from the Internet: http://www.payorid.com/Medicare/HIPAA.htm.

Kirby, William H., Jr., "Computer-Based Applications for Providers, Consumers and Insurers in Health Care Services and Education," IEEE, pp. 236-242, 1982.

North Carolina, Industrial Commission, Memorandum, "New Mandatory Medical Billing and Reimbursement Procedures," 2 pp., Nov. 30, 1999.

DownSeeker Scripts, "Free Download MedLink Script," 2 pp., Aug. 29, 1999.

The Free Library, "HNC Insurance Solutions Introduces AUTOADVISOR, the First Integrated Medical Repricing Software with Managed Care Component for the Auto Medical Claims Market" [online], Business Wire, Sep. 2, 1998 [retrieved on Dec. 14, 2010], 4 pp., Retrieved from the Internet: http://www.thefreelibrary.com/HNC+Insurance+Sol . . . .

Selby, Dayton W. and Federico, Robert J., "The Effects of Physicians' Computer Applications on Health Insurance Claims and Reimbursements," IEEE, pp. 746-751, 1979.

Waterhouse, Rosie, "Medical Tests for New Benefit 'Unfair': Over-Reliance on Health Evidence Attacked" [online], The Independent, Feb. 17, 1994 [retrieved on Dec. 20, 2010], 1 p., Retrieved from the Internet: http://www.independent.co.uk/news/uk/politics/medical-tests-for-new-benefit-unfair-overreliance-on-healt . . . .

Gustafson, Bobette M., "Preparing for Future Roles as Claims Payers" [online], Healthcare Financial Management, Jan. 1, 1996 [retrieved on Dec. 14, 2010[, 3 pp., Retrieved from the Internet: http://www.allbusiness.com/ . . . /538143-1.html.

"Repricing Window," The TriZetto Group, Inc., ClaimBatch Entry—CBE, Section 8—Adding Other Information, 12 pp.

(56) References Cited

OTHER PUBLICATIONS

Contract Management Solutions, "Company Overview" [online], Retrieved on Aug. 3, 2004, Retrieved From: http://www.cmsi.com/company, 1 p.
Contract Management Solutions, "Solutions Overview" [online], Retrieved on Aug. 3, 2004, Retrieved From: http://www.cmsi.com/solutions, 1 p.
Dicarta Enterprise Contract Management, "Products" [online], Retrieved on Aug. 3, 2004, Retrieved From: http://www.dicarta.com/html/products, 9 pp.
Contract Management Solutions, "Contract Manager" [online], Retrieved on Aug. 3, 2004, Retrieved From: http://www.cmsi.com/solutions/cm.htm, 3 pp.
Contract Management Solutions, "Deal Manager" [online], Retrieved on Aug. 3, 2004, Retrieved From: http://www.cmsi.com/solutions/dm.htm, 1 p.
Contract Management Solutions, "Technology" [online], Retrieved on Aug. 3, 2004, Retrieved From: http://www.cmsi.com/solutions/tech.htm, 1 p.
Dicarta Enterprise Contract Management, "Healthcare" [online], Retrieved on Aug. 3, 2004, Retrieved From: http://www.dicarta.com/html/products/healthcare.cfm, 2 pp.
Contract Management Solutions, "Compliance" [online], Retrieved on Aug. 3, 2004, Retrieved From: http://www.cmsi.com/solutions/compliance.htm, 2 pp.
Contract Management Solutions, "CMXchange" [online], Retrieved on Aug. 3, 2004, Retrieved From: http://www.cmsi.com/solutions/cmxc.htm, 1 p.
"Notification of Transmittal of the International Preliminary Report on Patentability" received on International Application No. PCT/US2005/008655, dated Jun. 28, 2008 (International Filing Date of App. is Mar. 15, 2005).
Current Claims of PCT/US2005/008655.
"Notification of Transmittal of the International Preliminary Report on Patentability" received on International Application No. PCT/US2005/008735, dated Jul. 17, 2006 (International Filing Date of App. is Mar. 16, 2005).
Current Claims of PCT/US2005/008735.
International Search Report & Written Opinion issued for PCT/US2005/036971 dated Dec. 26, 2006.
IBM, Solutions for Healthcare Management, "TriZetto NetworX and IBM: Driving Costs Out of Healthcare Management," 2 pp., Copyright 2009.
The Gantry Group, "ROI Value Delivery Through Streamlined Provider Contract Modeling" [online], [Retrieved on Apr. 18, 2011], 1 p., Retrieved From the Internet: http://www.gantrygroup.com/healthcare/research/detail.cfm?product_id=561.
"Healthcare Solutions: Health Plans—NetworX Pricer" [online], Copyright 2000-2011 [retrieved on Apr. 18, 2011], 1 p., Retrieved From the Internet: http://www.trizetto.com/hpSolutions/networXPricer.asp.

EHealthPartners, "TriZetto NetworX Pricer™ & Modeler™" [online], [Retrieved on Apr. 18, 2011], 1 p., Retrieved From the Internet: http://www.ehealthpartners.com/Applications/ApplicationExpertise/TriZettoNetworXPrice . . . .
White Paper, "The Gantry Group: Is TriZetto® NetworX Modeler® Delivering on its ROI Promise?," Copyright 2010, 8 pp.
"Preferred Care Partners Selects TriZetto's Facets Software and Specialized Components to . . . ", *Business Wire*, May 26, 2005, 2 pp.
"CareSource Selects TriZetto's CareAdvance Enterprise Software and Specialized Components to Help It Administer Medicaid Business" [online], *Business Wire*, 2 pp., Sep. 5, 2006 [retrieved on Apr. 18, 2011], Retrieved From the Internet: http://www.medinfonews.com/ar/1r.htm.
"CareFirst BlueCross BlueShield Selects TriZetto's NetworX Pricer Software to Automate Claims Pricing and Help Manage Costs" [online], Sep. 21, 2006 [retrieved on Apr. 18, 2011], 1 pp., Retrieve From the Internet: http://goliath.ecnext.com/coms2/gi_0199-5783145/CareFirst-BlueCross-BlueShield-Select . . . .
"Blue Shield of California Launches Work on System-Wide Technology Upgrade With TriZetto's Facets Software" [online], Jan. 29, 2008 [retrieved on Apr. 18, 2011], 1 pp., Retrieved From the Internet: https://www.blueshieldca.com/bsc/newsroom/pr/LegacyModernization_012908.jhtml.
"Blue Cross and Blue Shield of Minnesota Will Use TriZetto's NetworX Suite to Move Toward Value-Based Reimbursement Models" [online], *Business Wire*, May 11, 2010 [retrieved on Apr. 18, 2011], 2 pp., Retrieved From the Internet: http://www.businesswire.com/news/home/20100511005321/en/Blue-Cross-Blue-Shield-M . . . .
International Search Report and Written Opinion for PCT Application No. PCT/US2007/070298, dated Jan. 7, 2008, pp. 1-11.
"Patient-Centered Primary Care Collaborative, Commonwealth Fund, Dartmouth Institute Release Landmark Consensus Document on ACOs, Medical Homes" [online], Apr. 12, 2011 [retrieved on Jun. 7, 2011], EMR and Health IT News, 9 pp. Retrieved from the Internet: http://www.emrandhipaa.com/news/2011/04/12/patient-centered-primary-care-collaborative-commonwealth-fund-dartmouth-institute-release-landmark-consensus-document-on-acos-medical-homes.
Feucht, Daniel Francis, et al., "Session # 46 PD : ICD-10 : Implications on Pricing, Reserving, IT and Strategy," Society of Actuaries, SOA '10 Health Meeting, Jun. 28-30, 2010, 27 pp.
"ICD-10-CM-PCS MS-DRG Conversion Project, ICD-9-CM Coordination & Maintenance Committee," Centers for Medicare & Medicaid Services, Sep. 16, 2009, 74 pp.
Press Release, "TriZetto Introduces NetworX Modeler" [online], Nov. 18, 2003 [retrieved on Apr. 18, 2011], 2 pp., Retrieved From the Internet: http://www.trizetto.com/newsEvents/pressReleases/2003-11-18_NetworXModeler.asp.

* cited by examiner

SYSTEM AND METHOD FOR USING A FIRST ELECTRONIC REPRESENTATION OF CONTRACT TERMS FOR GENERATING A SECOND ELECTRONIC REPRESENTATION OF THE CONTRACT TERMS

CROSS-REFERENCE TO RELATED APPLICATIONS

The present application is a division of U.S. patent application Ser. No. 10/965,673 filed Oct. 14, 2004, titled "SYSTEM AND METHOD FOR USING A FIRST ELECTRONIC REPRESENTATION OF CONTRACT TERMS FOR GENERATING A SECOND ELECTRONIC REPRESENTATION OF THE CONTRACT TERMS, the disclosure of which is hereby incorporated herein by reference. The present application is also related to commonly assigned U.S. patent application Ser. No. 09/577,386 filed May 23, 2000 titled "NOVEL METHOD AND APPARATUS FOR REPRICING A REIMBURSEMENT CLAIM AGAINST A CONTRACT," now U.S. Pat. No. 7,904,317, and co-pending and commonly assigned U.S. patent application Ser. No. 10/923,539 filed Aug. 20, 2004 titled "SYSTEM AND METHOD FOR MODELING TERMS OF A CONTRACT UNDER NEGOTIATION TO DETERMINE THEIR IMPACT ON A CONTRACTING PARTY," the disclosures of which are hereby incorporated herein by reference.

TECHNICAL FIELD

This disclosure relates generally to contract management, and more particularly to using contract terms from a first electronic representation of a contract to form at least a part of a second electronic representation of the contract.

BACKGROUND OF THE INVENTION

Contracts govern many activities of individuals, companies, and other entities. The terms of contracts between the contracting parties are important for defining roles, responsibilities, rights, and obligations of each party. As one example, contracts govern the relationships between many service providers and insurers. For instance, in the third-party payer health care industry, a "third party" (referred to herein generally as an "insurer") pays for health care services received by a member (or "insured") from a service provider (any person, such as a doctor, nurse, dentist, pharmacist, etc., or institution, such as a hospital or clinic, that provides medical care). Examples of such third-party payers (or "insurers") include an insurance company (e.g., BlueCross® BlueShield®, Aetna® Inc., etc.), Health Maintenance Organization ("HMO"), Preferred Provider Organization ("PPO"), or the Federal Government (e.g., Medicare). The insurers negotiate with the service providers (e.g., hospitals, doctors, etc.) various terms, including the amounts (and corresponding conditions) that the insurers will pay the service providers for services rendered to the members of the insurers. For instance, a negotiated contract may specify that an insurer will pay a service provider X amount for performance of a given procedure (e.g., caesarean-section procedure, open heart surgery, blood test, routine physical exam, LASIK eye surgery, dental root canal, prescribed pharmaceuticals, etc.) for one of its members. The contract may specify those procedures for which the insurer will reimburse the service provider, as well as the corresponding reimbursement rates for each procedure. Of course, any arrangement imaginable that is agreeable to both parties may be provided for in the contracts, and such terms are becoming increasingly complex. The negotiated terms generally differ from service provider to service provider as the types of services and specialties of each service provider may differ. At any given time, an insurer may have many contracts in force for governing its relationship with its service providers.

Contract management systems are known for monitoring the contracts (e.g., to remind parties of their respective rights and obligations under the contract). More particularly, contract management systems may monitor which contracts are in place at any given time and remind parties as to their performance obligations as such obligations arise and contract renewals. As examples, such contract management systems are available from diCarta, Inc. (e.g., the diCarta Contracts Version 5 software solution) and Contract Management Solutions, Inc. (CMSI) (e.g., the CMSI 6.1 Software Suite). Particularly considering the large number of contracts that are in force at any given time for an insurer, the contract management systems are important tools for aiding the insurer in managing the life cycle of its various contracts from reminding the insurer of upcoming renewals to aiding the insurer during the negotiation process with a service provider to aiding the insurer in monitoring its obligations under an executed contract.

Typically, once contract terms are agreed upon and a contract is executed by the parties, the insurer provides the contract terms to an operator who interprets the terms and attempts to manually configure their contract management system in accordance with such terms. Particularly considering the increasing complexity of many terms in such contracts, the actual negotiated terms may differ materially from the configuration of the contract management system as a result of errors in the manual configuration process. In addition to the human errors that may arise in manually configuring an insurer's contract management system in accordance with an executed contract with a given service provider, such manual configuration also incurs undesirable delays in having the newly executed contract incorporated into the contract management system.

Additionally, claims processing systems are often implemented by an insurer, which are intended to at least partially automate the processing of claims received from service providers by insurers in accordance with the terms of the governing executed contracts. Thus, typically once contract terms are agreed upon and a contract is executed by the parties, the insurer's claims processing system is configured in accordance with such terms for processing claims received from the service provider (e.g., for determining the proper price to be paid by the insurer for a given claim in accordance with the terms of the governing contract).

Traditionally, the claims processing systems and the contract management systems are disparate systems, and the configurations of those systems to reflect the terms of a given contract are performed separately and thus do not ensure that the contract terms are reflected consistently across the various systems.

BRIEF SUMMARY OF THE INVENTION

The present invention is directed to a system and method in which contract terms from a first electronic representation of a contract are used to form at least a part of a second electronic representation of the contract. For instance, the first electronic representation of a contract may be formed for use with a first software application, such as an adjudication application, and such first electronic representation of the contract is used to form at least part of a second electronic representation of the contract, wherein such second electronic representation is used by a second software application, such as a contract management application. As described further herein, disparate applications often utilize different representations of contract terms (e.g., different formats for the electronic representation, etc.), and certain embodiments enable a second electronic representation to be formed at least in part from a first electronic representation so that the different electronic representations are consistent as to the overlapping contract terms included therein. Thus, according to certain embodiments, a first electronic representation of a contract is used to form at least part of a second electronic representation of the contract that is not compatible with the first electronic representation. The first and second electronic representations may be used by disparate applications.

In certain embodiments, a contract is represented electronically in an adjudication application that processes information and/or performs tasks according to the terms of the contract. One example of an adjudication application is a claim adjudication application that processes claims submitted to an insurer in accordance with the terms of a contract. Of course, other adjudication applications may perform other operations that are governed by terms of a contract, and thus such adjudication applications utilize an electronic representation of the governing contract. The electronic representation of the contract used by the adjudication application is, in certain embodiments, communicated to a contract management application for forming at least a portion of an electronic representation of a contract that is managed by the contract management application. As opposed to adjudicating actions that are governed by the contract (as with the adjudication application); the contract management application manages the contract to, for example, remind a party of the renewal date for the contract, remind the party of other deadlines (such as fixed payment dates, etc.) that arise under the contract. Thus, while the adjudication application performs operations, such as determining a payment amount for an insurer to pay a service provider for a submitted claim, that are governed by the terms of contract, the contract management application manages the contract itself The contract management application may require an electronic representation of the contract that it is to manage that differs from the electronic representation required by the adjudication application. Accordingly, in certain embodiments, the electronic representation of contract terms that is used by the adjudication application is translated into the electronic representation that is used by the contract management application for forming at least a part of the electronic representation of the contract to be managed by the contract management application. In one embodiment, the electronic representation of the contract on the adjudication application generates a plain language (e.g., plain English terminology) representation of the terms of the contract, and such plain language representation is communicated to the contract management application. For instance, at least one phrase describing a term of the contract may be generated. In certain implementations, the at least one phrase includes at least one sentence that describes the term of the contract.

As a specific example, in one embodiment an electronic representation of a contract between an insurer and a service provider is implemented within a claim adjudication application for computing the proper amount of payment for the insurer to pay the service provider for claims submitted to the insurer by the service provider. The rate terms of the contract that govern the payment for claims (used by the claim adjudication application) is communicated to the contract management application. Thus, the rate terms provided to the contract management application accurately specify the rate terms of the electronic representation of the contract that will be used by the claim adjudication system. Accordingly, the rate terms received by the contract management application can be used in forming a portion of the electronic contract between the insurer and the service provider that the contract management application manages. In addition to the rate terms received by the contract management application from the electronic representation used by the adjudication application, the electronic representation of the contract in the contract management system may include further information, such as contract term (e.g., expiration date), etc.

It is often desirable to represent terms of a contract across a plurality of disparate applications. For instance, an insurer may utilize both a claim adjudication system and a contract management application, and each of those disparate applications may have different electronic representations of a given contract. That is, the claim adjudication system may utilize a first electronic representation of a contract between the insurer and a service provider for adjudicating claims submitted to the insurer by the service provider. The contract management application is a disparate application that may utilize a different electronic representation of the contract between the insurer and the service provider, which the contract management application uses for managing the contract (e.g., to remind the insurer of the contract renewal deadline, etc.). Thus, traditionally these disparate applications require that different electronic representations of a given contract be formed for each application. Further, each of the different electronic representations have typically been created through manual entry of data into each application. Thus, a mistake in the data entry or inconsistent interpretation of the contract terms by data entry personnel results in inconsistency between the different electronic representations of a given contract.

In view of the above, manual entry of at least a portion of the contract terms into the contract management system is alleviated by certain embodiments provided herein, which improves efficiency and accuracy in creating the electronic representation of the contract to be managed by the contract management system. Further, in instances in which the terms of the electronic representation of the contract to be used by an adjudication application are communicated to the contract management application, the contract management application is assured that its representation of the contract terms accurately represent those terms that will actually be used for adjudication of the activities governed by the contract (e.g., claim payment by an insurer). That is, the contract terms are assured to be accurately reflected across disparate applications, even though the disparate applications may utilize different electronic representations (e.g., different formats, etc.) of the contract terms.

In one embodiment, a contract modeler application is implemented, such as that disclosed in co-pending and commonly assigned U.S. patent application Ser. No. 10/923, 539 filed Aug. 20, 2004 titled "SYSTEM AND METHOD FOR MODELING TERMS OF A CONTRACT UNDER NEGOTIATION TO DETERMINE THEIR IMPACT ON A CONTRACTING PARTY," the disclosure of which is hereby incorporated herein by reference. Such contract modeler application can model certain terms of a contract during contract negotiations to enable a party to analyze the impact of specific terms. Once the modeled terms of the contract are approved, such terms may be communicated to an adjudication application and/or contract management application in accordance with certain embodiments described herein.

While various examples are described herein for use in the third-party payer health care system, and particularly for use by an insurer, application of the techniques described herein are not intended to be limited to the third-party payer health care system. While the techniques described herein have particular applicability for insurers to enable accurate and efficient creation of electronic representations of contracts across the disparate applications commonly used by such insurers (e.g., claim adjudication application, contract management application, etc.), the techniques described herein can be readily applied within any other environments in which multiple electronic representations of a contract are desired. Further, while the examples described herein are directed to electronic representations of contracts between insurers and service providers, the techniques described can readily be applied to other types of contracts between other parties.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
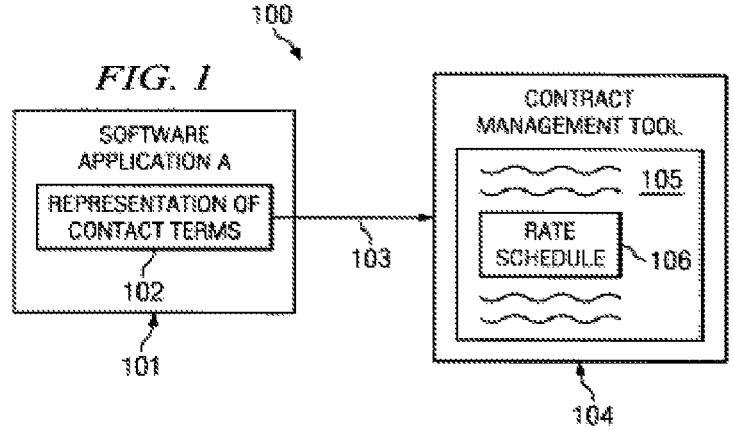
FIG. 1 shows an exemplary system according to one embodiment of the present invention.

FIG. 1 shows an exemplary system 100 according to one embodiment of the present invention. A first software application A, labeled 101, executes on a processor-based device, such as a personal computer (PC), laptop computer, personal digital assistant (PDA), workstation, server, etc. A second software application, such as a contract management tool 104, executes on a processor-based device, which may be the same or a different processor-based device as that which software application 101 executes. In software application 101, the terms of a contract are electronically represented, shown as representation 102. In accordance with certain embodiments provided herein, the electronic representation 102 of contract terms can be imported from the first software application 101 to a second software application, such as contract management application 104 in this example. That is, an electronic representation 102 of the contract terms is communicated via communication 103 to be included in an electronic representation 105 of the contract that is managed by contract management application 104. In this example, the representation of contract terms 102 is imported into contract representation 105 to provide the rate schedule 106 portion of such contract representation 105.

Communication 103 of the contract terms from electronic representation 102 to electronic representation 105 may be an electronic communication (e.g., across a network) or other communication to the contract management application 104. For instance, the electronic representation 102 of the contract terms may be saved to a computer-readable medium, such as a portable mass storage drive (e.g., USB drive), floppy disk, compact disk (CD), digital versatile disc (DVD), etc., and such computer-readable medium may be read by the contract management application 104. Irrespective of the technique of "communicating" 103 the electronic representation 102 of the contract to form the electronic representation 105 of the contract for use by contract management application 104, in certain embodiments the electronic representation 102 is advantageously utilized to generate an electronic representation 105 that is compatible with contract management application 104. Thus, because at least a portion (e.g., rate schedule terms 106) of the electronic representation 105 of the contract need not be manually entered into the contract management application 104, the time involved with creating the electronic representation 105 for use by the management application 104 in managing the contract is minimized. Further, manual errors are avoided, and it is ensured that the same terms utilized in software application 101 (e.g., an adjudication application) are consistently reflected in the electronic representation 105 of the contract utilized by contract management application 104.

In certain embodiments, the first software application 101 is an adjudication application, such as a claim adjudication application. The representation 102 of the contract terms utilized by such first software application 101 are preferably represented as described further in commonly assigned U.S. patent application Ser. No. 09/577,386 filed May 23, 2000, titled "NOVEL METHOD AND APPARATUS FOR REPRICING A REIMBURSEMENT CLAIM AGAINST A CONTRACT," now. U.S. Pat. No. 7,904,317, the disclosure of which is incorporated herein by reference. In certain embodiments, first software application 101 is a contract modeler application, such as described in co-pending and commonly assigned U.S. patent application Ser. No. 10/923,539 filed Aug. 20, 2004, titled "SYSTEM AND METHOD FOR MODELING TERMS OF A CONTRACT UNDER NEGOTIATION TO DETERMINE THEIR IMPACT ON A CONTRACTING PARTY," the disclosure of which is incorporated herein by reference. In one embodiment, the electronic representation 102 of the contract terms is utilized within a contract modeler application during negotiation of the contract terms. For instance, various terms of the contract may be modified within the contract modeler application to enable a party to analyze the impact of the terms. As described further in co-pending and commonly assigned U.S. patent application Ser. No. 10/923,539 titled "SYSTEM AND METHOD FOR MODELING TERMS OF A CONTRACT UNDER NEGOTIATION TO DETERMINE THEIR IMPACT ON A CONTRACTING PARTY," upon agreement being reached between the parties as to the terms of a contract, the electronic representation of the agreed-upon terms of the contract can then be communicated from the modeler to an adjudication system for use in adjudicating actions that are governed by the contract terms (e.g., adjudicating payment of claims submitted to an insurer pursuant to the rate terms of the contract). In accordance with embodiments provided herein, such electronic representation 102 of the contract terms may be used for generating at least a portion of another electronic representation 105 of a contract that can be used by another application, such as contract management application 104.

Figure 2:
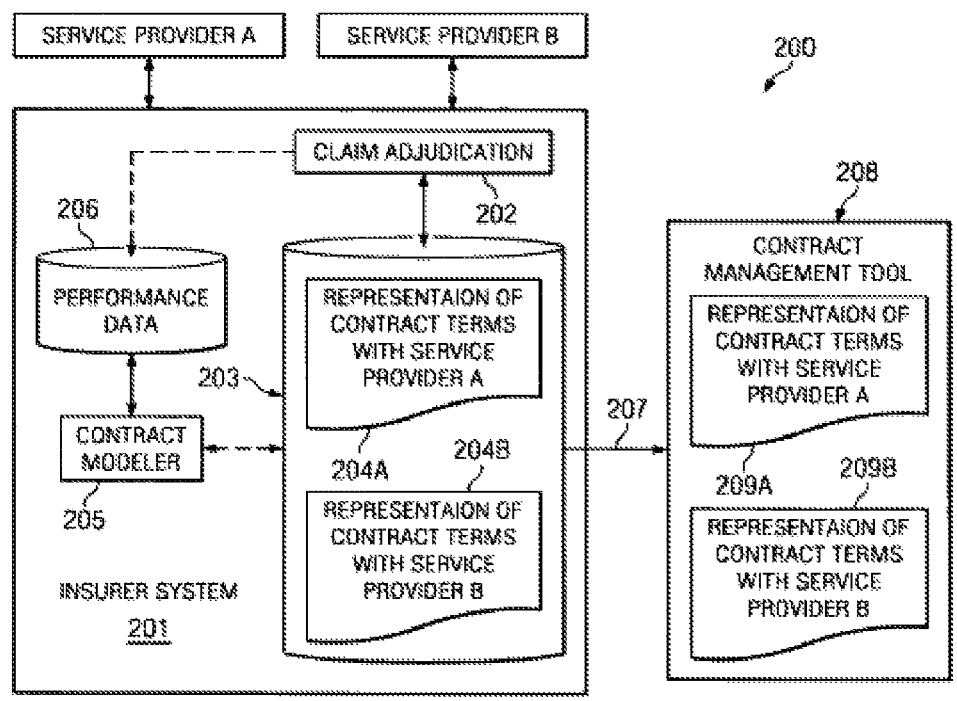
FIG. 2 shows an exemplary third-party payer health care system in which one embodiment of the present invention is employed.

FIG. 2 shows an exemplary third-party payer health care system 200 in which one embodiment of the present invention is employed. In this example, an insurer has negotiated contracts with different service providers, such as service providers A and B. Insurer system 201 includes data storage 203 that stores an electronic representation of contract terms between the insurer and the service providers, such as representation 204A of the contract terms governing the relationship of the insurer with Service Provider A and representation 204B of the contract terms governing the relationship of the insurer with Service Provider B. Claim adjudication application 202 is also included, which uses electronic representations 204A and 204B of the contracts to determine the payment amount for claims submitted to the insurer by Service Providers A and B, respectively. The electronic representations 204A and 204B of the contracts and the use of such electronic representations by claim adjudication application 202 are preferably employed in the manner described further in commonly assigned U.S. patent application Ser. No. 09/577,386 titled "NOVEL METHOD AND APPARATUS FOR REPRICING A REIMBURSEMENT CLAIM AGAINST A CONTRACT," now U.S. Pat. No. 7,904,317.

In this example, contract modeler application 205 is also included. As described further in co-pending and commonly assigned U.S. patent application Ser. No. 10/923,539 titled "SYSTEM AND METHOD FOR MODELING TERMS OF A CONTRACT UNDER NEGOTIATION TO DETERMINE THEIR IMPACT ON A CONTRACTING PARTY," such contract modeler application 205 may use performance data 206 to model the impact of terms of a contract under negotiation. Once the contract terms are agreed to by the insurer and the service provider, the electronic representation of the agreed-upon terms of such contract may be stored to data storage 203 (e.g., as with electronic representations 204A and 204B) and used by claim adjudication system 202 to govern the payment by the insurer of claims submitted by the service providers in accordance with the terms of the executed contracts.

In accordance with certain embodiments provided herein, the contract terms in place on the insurer system 201 for use by claim adjudication application 202 (e.g., electronic representations 204A and 204B) can be communicated, via communication 207, to a contract management tool 208, and used for forming at least a portion of the representation of contract terms in such contract management tool 208. Such contract management tool 208 may be included on the insurer's system 201, or it may be included on a third-party's system for managing the insurer's contracts with service providers. In the illustrated example, the representations of contract terms 204A and 204B for the contracts that the insurer has with Service Providers A and B, respectively, are communicated to contract management tool 208 and used for forming at least part of the representations of contract terms 209A and 209B for the contracts that the insurer has with Service Providers A and B, respectively.

In this example, the rate terms that are used for governing claim adjudication may be represented in electronic representations 204A and 204B, and thus may not represent the full contractual terms between the insurer and the service providers. Information in addition to the rate terms, such as duration of the contract (e.g., when it expires) and/or other legal details of the contract, may be desired in the contract representations 209A and 209B in the contract management tool 208. However, the rate terms represented by electronic representations 204A and 204B, which are actually used for adjudicating claims, are used to accurately import these rate terms into the electronic representations 209A and 209B on the contract management tool, thus not requiring manual input of such rate information to the contract management tool 208.

Figure 3:
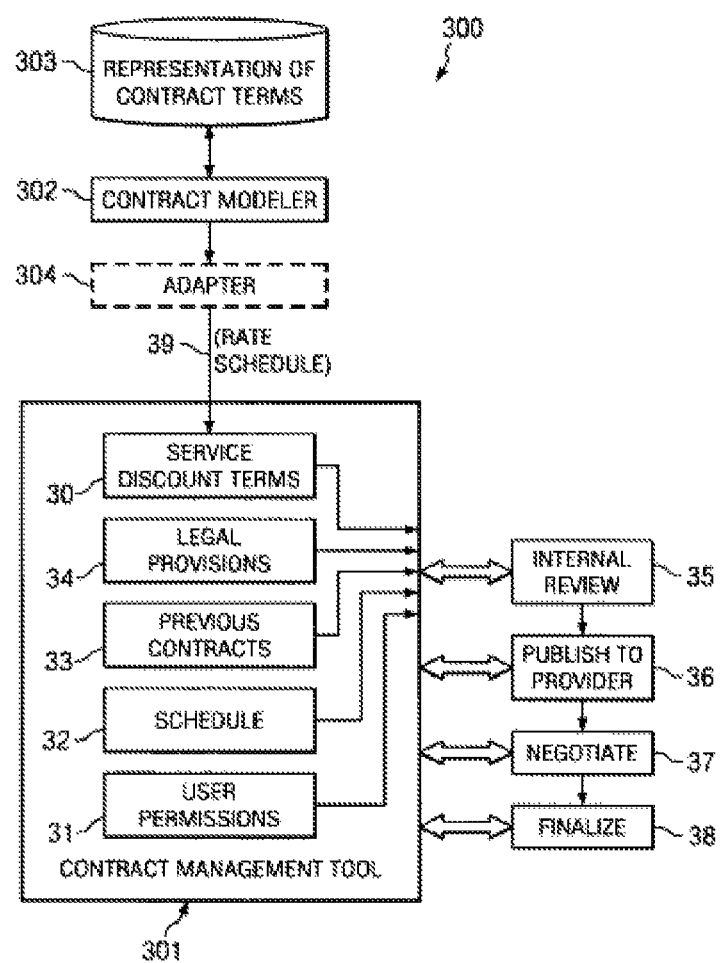
FIG. 3 shows an exemplary process flow 300 for generating a contract between an insurer and a service provider.

FIG. 3 shows an exemplary process flow 300 for generating a contract between an insurer and a service provider. In this example, a contract management application 301 is used manage various aspects of the contract negotiation/generation process. The contract management application utilizes an electronic representation of various terms of a contract to be managed, such as service discount terms 30, user permissions 31, schedule 32, previous contracts 33, legal provisions 34. Blocks 30 through 34 represent functionality of the contract management application. Block 30 is the proposed negotiated service discounts, an example of these types of terms is included in Table 1 below. Block 31 are electronic representations of the rights for each user of the contract management application, such as whether they have rights to read and/or modify a contract.

In creating and negotiating a contract with a service provider, the insurer's personnel may perform operations 35-38 described hereafter, wherein the insurer's personnel may interact with contract management application 301 in performing one or more of those operations. In generating a contract, a draft of the contract is generally created (e.g., from previous contracts 33) and that draft of the contract undergoes internal review 35 within the insurer organization. The contract management application 301 may automate the publishing of the draft to a defined set of individuals for the review process. Once approved in the internal review, the approved draft of the contract is published in block 36 to the service provider with whom the insurer is negotiating the contract. The contract management application 301 may automate this publishing aspect. Once the service provider has reviewed the contract, the insurer and service provider may negotiate various provisions (or "terms") of the contract, in block 37. The contract management application 301 may identify the revisions during the negotiation process, including predefined acceptable alternatives to originally proposed provisions. As a result of such negotiation, various terms of the contract may be modified, and the modified contract may again undergo internal review 35 and then be re-published 36 to the service provider. Once the terms of the contract are agreed to in the negotiation process 37, the contract may be sent to the appropriate authority (e.g., management) of the insurer to finalize the contract, in block 38, and execute the contract on behalf of the insurer. The contract management application 301 retains the final version of the contract.

As shown, in this example, the insurer may also have a contract modeler application 302 that uses an electronic representation of contract terms 303 to enable a user to analyze the impact of the terms during the negotiation process. More specifically, electronic representation 303 represents the financial terms of the contract, such as the claim payment terms in an insurer/service provider contract, and modeler application 302 models the impact that such financial terms will have on a party to the contract (e.g., based on historical performance data). In this example, the electronic representation 303 of the financial terms (which is used by contract modeler application 302) is used to import, via communication 39, such financial terms to the electronic representation of the contract being managed by the contract management tool 301. Specifically, the electronic representation 303 of the contract terms are used to generate the electronic representation of service discount terms 30 for use by contract management tool 301. Thus, the insurer's system can generate, from electronic representation 303 of the contract terms, at least the service discount terms 30 in an electronic representation that is compatible with contract management tool 301. As described further herein, in certain embodiments adapter(s) 304 is/are used to translate the electronic representation 303 of the financial terms to a compatible format for use by contract management tool 301.

Figure 4:
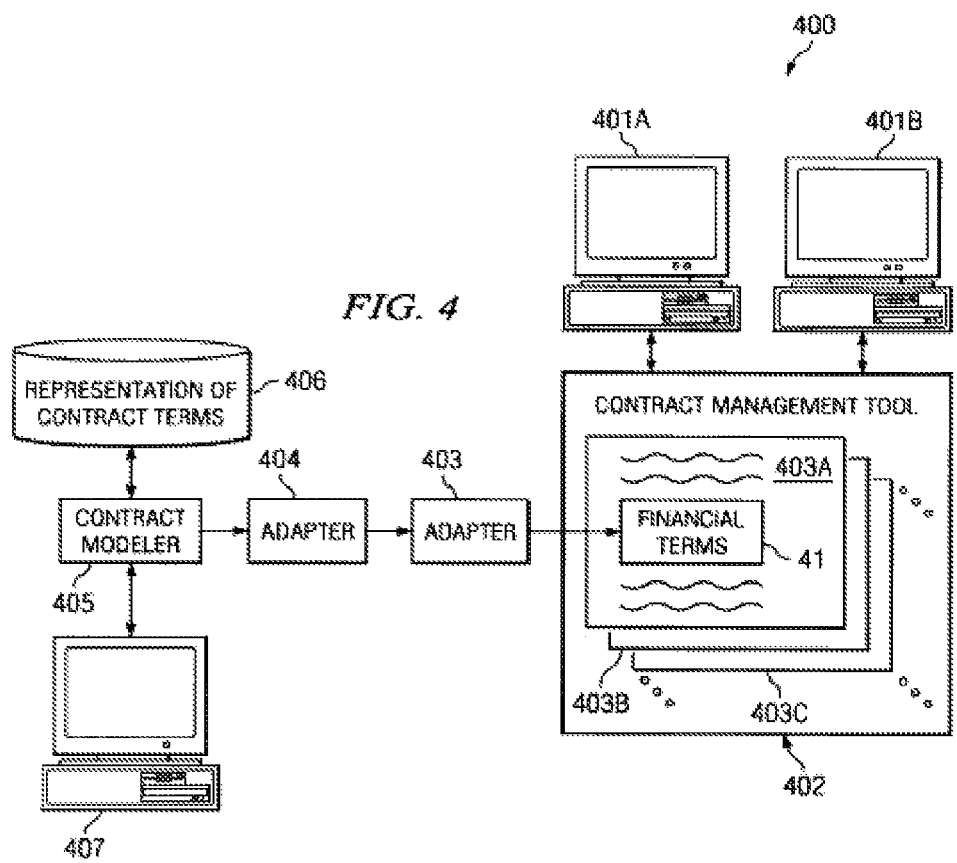
FIG. 4 shows an exemplary system in which adapters are used for translating a first electronic representation of contract terms into a second electronic representation of contract terms in accordance with certain embodiments of the present invention.

FIG. 4 shows an exemplary system 400 in which adapters 403 and 404 are used for translating a first electronic representation 406 of contract terms into a second electronic representation 403A of contract terms in accordance with certain embodiments of the present invention. The adapters 403 and 404 are preferably implemented as described in concurrently filed and commonly assigned U.S. patent application Ser. No. 10/965,253 titled "INTERFACING DISPARATE SOFTWARE APPLICATIONS," the disclosure of which is hereby incorporated herein by reference.

Exemplary system 400 includes a processor-based device (e.g., PC) 407 that executes contract modeler application 405 which uses a first electronic representation 406 of the financial terms (e.g., claim rates) of a contract for modeling the impact of such financial terms on a party (e.g., insurer). A preferable electronic representation 406 for representing terms of a contract between an insurer and a service provider is described further in co-pending U.S. patent application Ser. No. 09/577,386 titled "NOVEL METHOD AND APPARATUS FOR REPRICING A REIMBURSEMENT CLAIM AGAINST A CONTRACT", now U.S. Pat. No. 7,904,317, the disclosure of which is incorporated herein by reference. In general, this technique represents each term of a contract with a qualifier and a corresponding calculation method. An example of terms represented in this manner is provided in Table 1 below:

TABLE 1

| Term | Qualifier | Calculation Method |
| --- | --- | --- |
| Chemotherapy Treatment Case Rate | DRGCode410 | Pricing is a case rate of $6000 for up to 15 days and $1500 per day for each additional day. Limit the allowed to be the lesser of the discounted rate or charges. on the bill. |

TABLE 1-continued

| Term | Qualifier | Calculation Method |
| --- | --- | --- |
| ICU/CCU Per diem | Any Revenue codes with values of 200 through 219 | Pricing is a per diem of $1400 per day. |

Accordingly, as described further in co-pending U.S. patent application Ser. No. 09/577,386 titled "NOVEL METHOD AND APPARATUS FOR REPRICING A REIMBURSEMENT CLAIM AGAINST A CONTRACT," now U.S. Pat. No. 7,904,317, terms of a contract may be electronically represented by associating with each term information representing at least one qualifier having a corresponding calculation method, wherein the at least one qualifier identifies at least one condition to be satisfied by a claim for reimbursement in order to trigger the corresponding calculation method. Further information may be associated with each term representing a priority of such term relative to the other terms to enable a determination of which terms take priority in the event that more than one term's qualifier is satisfied.

Processor-based devices (e.g., PCs) 401A and 401B provide communicative access to contract management tool 402 for managing contracts between an insurer and service providers. Thus, electronic representations 403A, 403B, 403C, . . . , of contracts between the insurer and various service providers are utilized by contract management tool 402. Contract management tool 402 may be a legacy system that electronically represents contracts differently than the electronic representations 406 used by contract modeler 405 and/or a claim adjudication application (not shown). Adapters 403 and 404 enable the electronic representations 406 of financial terms of contracts to be imported to form the financial terms of the electronic representations of the corresponding contracts in the contract management tool. For instance, an electronic representation 406 of the financial terms of a contract between an insurer and a first service provider is imported to form the financial terms 41 of the electronic representation of such contract between the insurer and the first service provider in the contract management tool 402.

Currently filed and commonly assigned U.S. patent application Ser. No. 10/965,253 titled "INTERFACING DISPARATE SOFTWARE APPLICATIONS," describes an embodiment of adapters that provides a decentralized architecture using a common communication bus protocol. For example, each adapter of an embodiment is adapted for proprietary data communication with one or more associated applications, thereby providing information communication suitable for establishing an end of a software application information communication link. Additionally, each adapter of the foregoing embodiment is adapted for data communication with other adapters using protocols common to each such adapter. According to one embodiment, the common protocols utilized in inter-adapter communications comprise an open or standardized protocol, such as the extensible markup language (XML), simple object access protocol (SOAP), web services description language (WSDL), universal description, discovery and integration (UDDI), as a common communication bus protocol.

Thus, adapter 404 preferably includes an application-specific interface operable to interface with contract modeler 405 (or other application) to retrieve electronic representation 406 of the financial terms of a desired contract. Further, adapter 404 is operable to translate the electronic representation 406 of the financial terms into an inter-adapter format, e.g., XML. Thus, the adapter 404 preferably includes an inter-adapter interface for communicating the electronic representation, e.g., via XML, to the adapter 403. Similarly, adapter 403 preferably includes an inter-adapter interface for receiving the electronic representation from adapter 404. Adapter 403 is operable to translate the received electronic representation of the financial terms into an application-specific format. That is, the adapter 403 is operable to translate the received electronic representation of the financial terms (which is received in the inter-adapter format) to a format desired by contract management tool 402. Adapter 403 preferably includes an application-specific interface operable to interface with contract management tool 402 to import the financial terms 41 into the electronic representation 403A of the corresponding contract.

In certain embodiments, a plain English description of the electronic representation 406 is provided to the contract management tool 402. Co-pending U.S. patent application Ser. No. 09/577,386 titled "NOVEL METHOD AND APPARATUS FOR REPRICING A REIMBURSEMENT CLAIM AGAINST A CONTRACT," now U.S. Pat. No. 7,904,317, discloses a technique in which the contract terms are represented in plain language (e.g., plain English terminology). For instance, in certain embodiments, a software application includes a user interface that provides a phrase describing a term of a contract for reimbursement, wherein the phrase includes at least one input field for receiving input from a user. The software application also includes code for generating information representing at least one term of a contract based at least in part on information input to the at least one input field. The phrase presented by the user interface may include at least one sentence, wherein upon input to the at least one input field the phrase forms at least one complete sentence. The input field(s) may include a drop-down menu providing a plurality of choices for selection of input to such field(s). Accordingly, the user need not be restricted to understanding and/or working with the specific format in which the terms of the contract are electronically represented, but may instead interact with the plain language interface for properly creating the electronic representation. Further, if desired, the plain language description of the contract terms, as electronically represented, can be generated and viewed and/or printed and may be included as an attachment to or overview of the terms of a contract (as such contract is electronically represented by the software application). Thus, in certain embodiments, this plain language description of the contract terms represented by electronic representation 406 is generated and imported to the electronic representation of the contract in contract management application 402.

Figure 5:
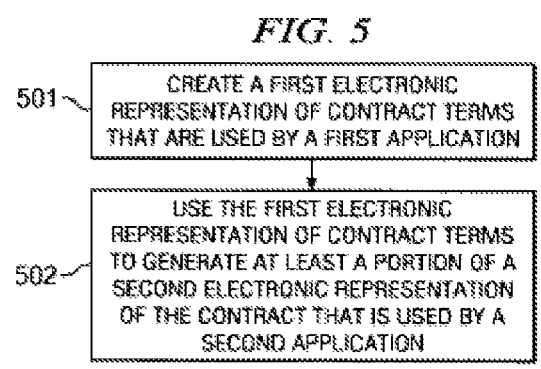
FIG. 5 shows an exemplary operational flow diagram of an embodiment of the present invention.

The techniques described herein are not limited to the specific examples provided above. For instance, FIG. 5 shows an exemplary operational flow diagram for one embodiment of the present invention. In operational block 501, a first electronic representation of contract terms that are used by a first application is created on a system. In certain embodiments, this first application is an adjudication application, such as a claim adjudication application. Also, as described above, a modeler application may be used in certain embodiments for creating such first electronic representation of contract terms. In operational block 502, the system uses the first electronic representation of contract terms to generate at least a portion of a second electronic representation of the contract that is used by a second application. As described above, the second electronic representation may be a different representation that is required by the second application, such as by a legacy contract management application. Thus, because the system can effectively import the contract terms from the first electronic representation into the second electronic representation, the contract terms are assured to be represented consistently across the different applications. Further, the second electronic representation of the contract can be created more efficiently than requiring a user to manually enter the terms that are represented in the first electronic representation.

The various embodiments of the software applications (e.g., contract modeler, contract management tool, etc.), as well as the electronic representations of contractual terms, described above may be implemented via computer-executable software code. The executable software code may be obtained from a computer-readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, as used herein, computer-readable media can include any medium that can store or transfer information.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for electronically representing varying terms from insurer payment contracts across multiple software applications comprising:

electronically representing a first insurer contract between the insurer and a first service provider in a contract modeling application in a first electronic format, wherein the insurer contract contains multiple first terms;

receiving at the insurer, a first claim for services and first request for payment from the first service provider;

responsive to the first claim and request, importing at least first payment terms of the multiple first terms of the first insurer contract from the contract modeling application to a claim adjudication application, wherein the importing includes translating by a first adapter, the first payment terms of the multiple first terms from the first electronic format to a second electronic format recognizable by the claim adjudication application;

determining by the claim adjudication application a first amount to be paid to the first service provider responsive to the first claim and request in accordance with the imported first payment terms in the second electronic format; and importing the multiple first terms of the first insurer contract from one of the contract modeling application and the claim adjudication application to a contract management application, wherein the importing includes translating by one of a second adapter and a third adapter, the multiple first terms from one of the first and second electronic formats to a third electronic format recognizable by the contract management application.

2. The method of claim 1, wherein the translation of the first payment terms into the second electronic format includes associating at least one qualifier and a corresponding calculation method with each of the first payment terms, wherein the at least one qualifier specifies a condition which, when satisfied by the first claim, triggers the corresponding calculation method to be used to determine the first amount to be paid to the first service provider.

3. The method of claim 2, wherein in a case where multiple payment terms are triggered by the first claim, determining by the claim adjudication application priority of applicability of the multiple payment terms.

4. The method of claim 1, further comprising managing the insurer contract by the contract management application, wherein the management includes reminding one of the insurer or the first service provider of one or more deadlines arising under the first insurer contract.

5. The method of claim 1, wherein the one or more deadlines are selected from the group consisting of a contract renewal due date and a fixed payment due date.

6. The method of claim 1, wherein electronically representing a first insurer contract between the insurer and a first service provider in a contract modeling application includes:
modeling a monetary impact of proposed terms of a proposed insurer contract on one or both of the insurer and first service provider using expected performance data;
revising the proposed terms of the proposed insurer contract based on a result of the modeling; and
finalizing the revised proposed insurer contract as the insurer contract for electronic representation and storing the insurer contract in a computer-readable storage medium.

7. The method of claim 1, further comprising deriving expected performance data from past performance data received at the contract modeler application from the claim adjudication application.

8. The method of claim 7, wherein the past performance data includes claim data from a previous claim for services and request for payment from at least the first service provider.

9. The method of claim 1, further comprising:
electronically representing a second insurer contract between the insurer and a second service provider in a contract modeling application in the first electronic format, wherein the second insurer contract contains multiple second terms;
receiving at the insurer, a second claim for services and second request for payment from the second service provider;
responsive to the second claim and request, importing at least second payment terms of the multiple second terms of the second insurer contract from the contract modeling application to a claim adjudication application, wherein the importing includes translating by the first adapter, the second payment terms of the multiple second terms from the first electronic format to the second electronic format recognizable by the claim adjudication application;
determining by the claim adjudication application a second amount to be paid to the second service provider responsive to the second claim and request in accordance with the imported second payment terms in the second electronic format; and
importing the multiple second terms of the second insurer contract from one of the contract modeling application and the claim adjudication application to a contract management application, wherein the importing includes translating by one of the second adapter and a third adapter, the multiple second terms from one of the first and second electronic formats to a third electronic format recognizable by the contract management application.

10. A system for representing varying terms from insurer payment contracts across multiple software applications comprising:
a contract modeling application executing on a first processor-based device for electronically representing an insurer contract between the insurer, wherein the insurer contract contains multiple terms;
an adjudication application executing on a second processor-based device for:
receiving at the insurer, a claim for services and request for payment from the first service provider and responsive to the claim and request,
importing at least payment terms of the multiple terms of the insurer contract from the contract modeling application, wherein the importing includes translating by a first adapter, the payment terms of the multiple terms from a first electronic format to a second electronic format recognizable by the claim adjudication application;
determining an amount to be paid to the first service provider responsive to the claim and request in accordance with the imported payment terms in the second electronic format; and
a contract modeling application executing on a third processor-based device for importing the multiple terms of the insurer contract from one of the contract modeling application and the claim adjudication application, wherein the importing includes translating by one of a second adapter and a third adapter, the multiple terms from one of the first and second electronic formats to a third electronic format recognizable by the contract management application.

11. The system of claim 10, wherein the first and second processor-based devices are the same and the third processor-based device is a different device.

12. The system of claim 10, wherein the first, second and third processor-based devices are selected from the group consisting of a personal computer (PC), laptop computer, personal digital assistant (PDA), workstation, and server.

* * * * *